United States Patent
Iida et al.

(10) Patent No.: US 12,307,896 B2
(45) Date of Patent: May 20, 2025

(54) CONTROL METHOD, COMPUTER-READABLE MEDIUM, INFORMATION PROCESSING DEVICE, AND INFORMATION PROVIDING METHOD

(71) Applicant: Panasonic Intellectual Property Management Co., Ltd., Osaka (JP)

(72) Inventors: Takuma Iida, Kanagawa Ken (JP); Akihiko Iguchi, Osaka Fu (JP); Fumio Kosuge, Kanagawa Ken (JP); Tomohiro Terada, Kanagawa Ken (JP); Tomohiro Iwama, Kanagawa Ken (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 79 days.

(21) Appl. No.: 18/228,778

(22) Filed: Aug. 1, 2023

(65) Prior Publication Data

US 2023/0394969 A1  Dec. 7, 2023

Related U.S. Application Data

(63) Continuation of application No. PCT/JP2022/014670, filed on Mar. 25, 2022.

(30) Foreign Application Priority Data

Mar. 25, 2021 (JP) .................. 2021-051901

(51) Int. Cl.
*G08G 1/14* (2006.01)
*G08G 1/01* (2006.01)

(52) U.S. Cl.
CPC .......... *G08G 1/143* (2013.01); *G08G 1/0129* (2013.01); *G08G 1/145* (2013.01)

(58) Field of Classification Search
CPC ...... G08G 1/143; G08G 1/0129; G08G 1/145; G08G 1/14; G08G 1/144; G08G 1/146;
(Continued)

(56) References Cited

U.S. PATENT DOCUMENTS 11,436,924 B1*  9/2022  Gray ................. G06Q 40/08
2009/0198443 A1  8/2009  Yamazaki
(Continued)

FOREIGN PATENT DOCUMENTS

JP  2009-186205  8/2009
JP  2011-242305  12/2011
(Continued)

OTHER PUBLICATIONS

International Search Report issued in International Patent Application No. PCT/JP2022/014670, dated Jun. 14, 2022, along with an English translation thereof.

*Primary Examiner* — Anh V La
(74) *Attorney, Agent, or Firm* — Greenblum & Bernstein, P.L.C.

(57) ABSTRACT

A control method is of an information processing device used for a parking lot management system. The control method causes a computer of the information processing device to perform: acquiring surrounding environment information of a parking location from the parking lot management system; determining a candidate parking location of a vehicle, based on the surrounding environment information; generating display information representing the candidate parking location to which the surrounding environment information is added; and causing a display unit of the information processing device to output the display information.

7 Claims, 13 Drawing Sheets

(58) Field of Classification Search
CPC ........ G01C 21/36; G16Y 10/40; G16Y 20/20; G16Y 40/60
USPC ...................... 340/932.2, 933, 937, 988, 990
See application file for complete search history.

(56) References Cited

U.S. PATENT DOCUMENTS

| | | | |
|---|---|---|---|
| 2018/0001930 A1* | 1/2018 | Sham ...................... | G01S 15/86 |
| 2019/0180621 A1 | 6/2019 | Matsuda et al. | |
| 2020/0049518 A1* | 2/2020 | Lee .................... | G01C 21/3492 |
| 2020/0394914 A1* | 12/2020 | Higuchi .................. | H04L 67/12 |
| 2021/0224769 A1* | 7/2021 | Sun ........................ | G08G 1/147 |

FOREIGN PATENT DOCUMENTS

| | | |
|---|---|---|
| JP | 2019-152950 | 9/2019 |
| WO | 2018/037780 | 3/2018 |

* cited by examiner

FIG.11
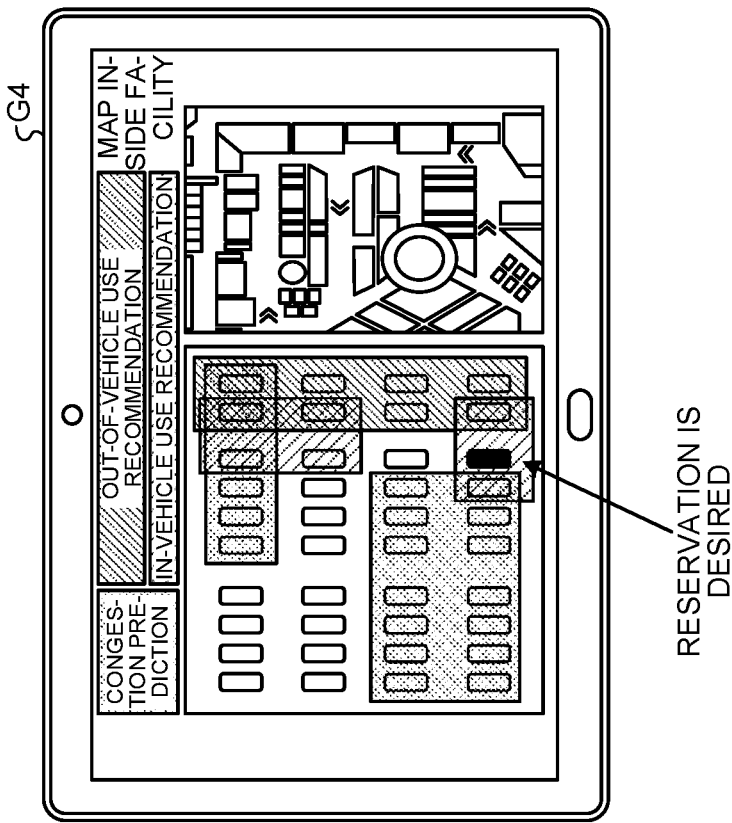
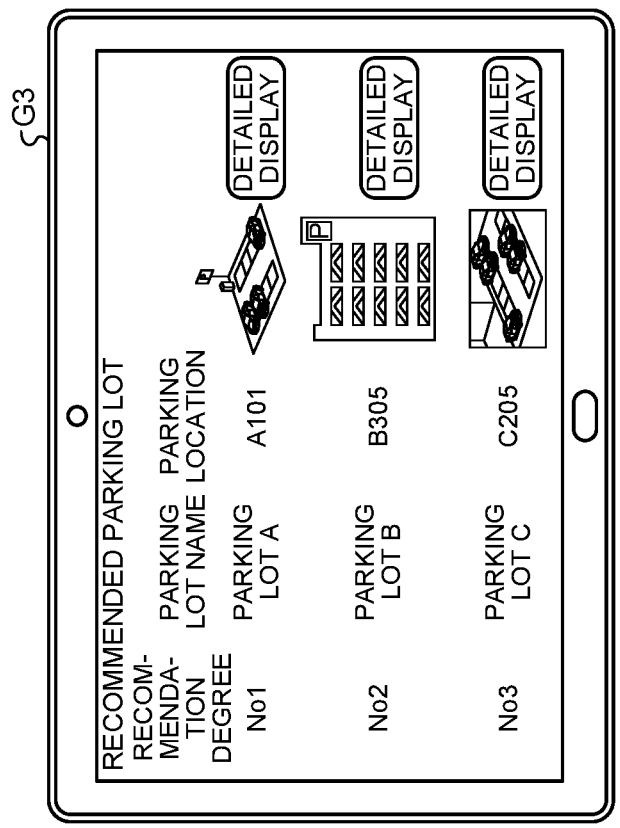

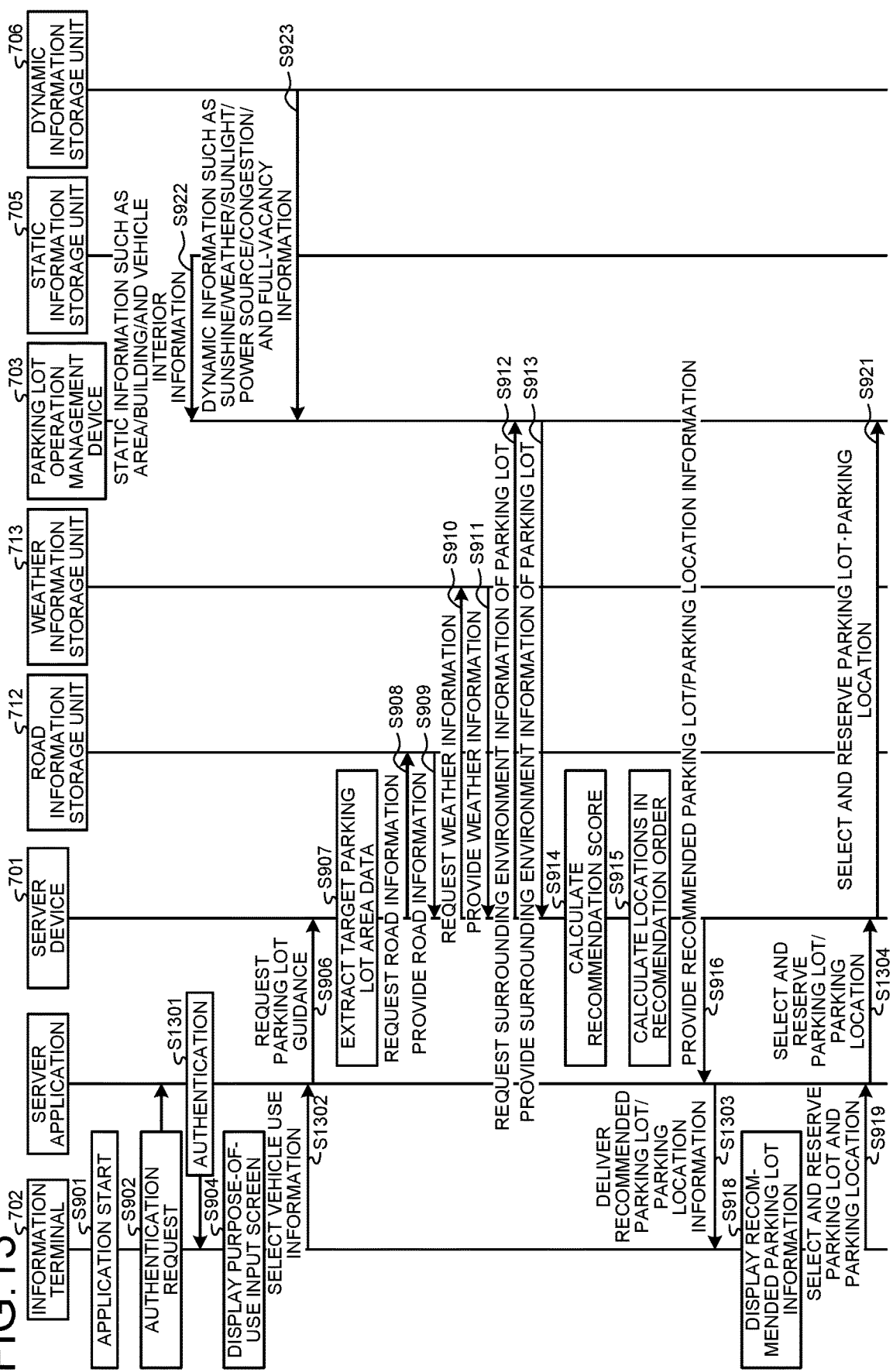

CONTROL METHOD, COMPUTER-READABLE MEDIUM, INFORMATION PROCESSING DEVICE, AND INFORMATION PROVIDING METHOD

CROSS-REFERENCE TO RELATED APPLICATIONS

This application is a continuation of International Application No. PCT/JP2022/014670, filed on Mar. 25, 2022 which claims the benefit of priority of the prior Japanese Patent Application No. 2021-051901, filed on Mar. 25, 2021, the entire contents of which are incorporated herein by reference.

FIELD

The present disclosure relates to a control method, a computer-readable medium, an information processing device, and an information providing method.

BACKGROUND

With the development of mobility as a service (MaaS), vehicles are increasingly providing a variety of services (for example, mobile sales) as well as personal use, and parking locations and needs for such parking locations may change significantly. A related technique is described in Japanese Patent Application Laid-open No. 2011-242305.

The present disclosure provides a control method, a computer-readable medium, an information processing device, and an information providing method that can increase the convenience of vehicle users.

SUMMARY

A control method according to the present disclosure is of an information processing device used for a parking lot management system. The control method causes a computer of the information processing device to perform: acquiring surrounding environment information of a parking location from the parking lot management system; determining a candidate parking location of a vehicle, based on the surrounding environment information; generating display information representing the candidate parking location to which the surrounding environment information is added; and causing a display unit of the information processing device to output the display information.

BRIEF DESCRIPTION OF THE DRAWINGS

FIG. 11 is a diagram illustrating an example of a display screen including recommended parking lot information in the parking navigation system according to the third embodiment;

FIG. 13 is a sequence diagram illustrating an example of the flow of a process of providing candidate parking locations in a parking navigation system according to a first variation.

DETAILED DESCRIPTION

Embodiments of a control method, a computer program product, an information processing device, and an information providing method according to the present disclosure are described below with reference to the drawings.

First Embodiment

A parking navigation system 10 according to the first embodiment of the present disclosure is described below with reference to the drawings.

Figure 1:
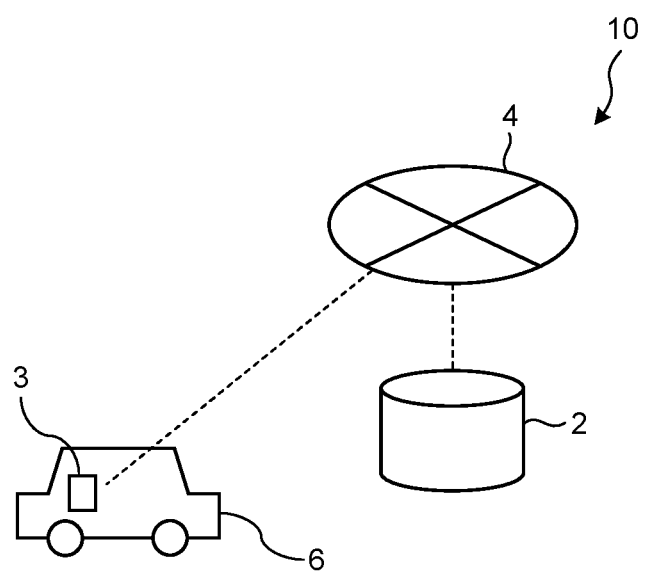
FIG. 1 is a diagram illustrating an example of a schematic configuration of a parking navigation system according to a first embodiment.

First, an example of an overall configuration of the parking navigation system 10 is described with reference to FIG. 1. FIG. 1 is a diagram illustrating an example of a schematic configuration of the parking navigation system according to the first embodiment.

The parking navigation system 10 of the present embodiment includes a server device 2 and an on-vehicle device 3. Note that the server device 2 and the on-vehicle device 3 are connected to each other via the Internet 4 which is an example of a network.

The server device 2 transmits various types of information, such as surrounding environment information of candidate parking locations of a vehicle 6, to an external device such as the on-vehicle device 3.

The on-vehicle device 3 displays the candidate parking locations of the vehicle 6, the surrounding environment information of the candidate parking locations, or the like on a touch panel 37 (see FIG. 2) which is an example of a display unit provided in the on-vehicle device 3. In the present embodiment, the on-vehicle device 3 is provided in the vehicle 6. The on-vehicle device 3 may be a navigation device provided in the vehicle 6. The navigation device may also serve as the on-vehicle device 3 by installing an application on the navigation device provided in the vehicle 6. Alternatively, the on-vehicle device 3 may be a portable terminal. The on-vehicle device 3 is an example of an information processing device in the present disclosure.

The information processing device in the present disclosure may be, for example, a smartphone. The smartphone may also serve as an information processing device by installing an application on the smartphone. The present disclosure can be applied even when a user is walking around with a smartphone serving as an information processing device.

Figure 2:
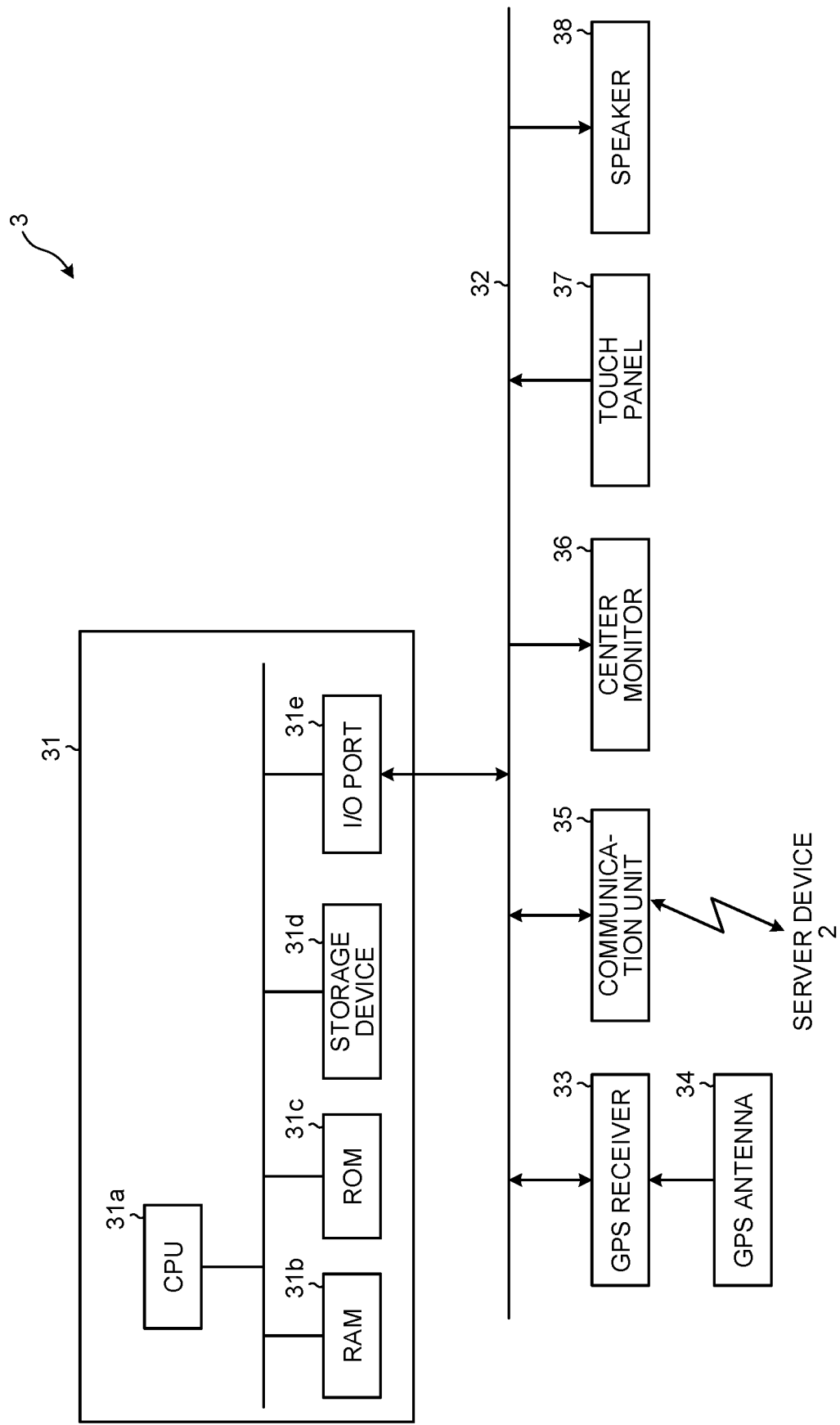
FIG. 2 is a hardware block diagram illustrating an example of a hardware configuration of an on-vehicle system according to the first embodiment.

An example of a hardware configuration of the on-vehicle device 3 is described below with reference to FIG. 2. FIG. 2 is a hardware block diagram illustrating an example of the hardware configuration of the on-vehicle device according to the first embodiment.

The on-vehicle device 3 is installed in the vehicle 6 and includes an electronic control unit (ECU) 31, a GPS receiver 33, a communication unit 35, a center monitor 36, the touch panel 37, and a speaker 38. These parts are connected to one another by a bus 32.

The ECU 31 is configured, for example, as a computer including a central processing unit (CPU) 31a, a random access memory (RAM) 31b, and a read only memory (ROM) 31c. Note that the ECU 31 may have a built-in storage device 31d including a hard disk drive (HDD) or the like. The ECU 31 further includes an input/output (I/O) port 31e that can transmit and receive signals to and from various peripheral devices.

The RAM 31b, the ROM 31c, the storage device 31d, and the I/O port 31e of the ECU 31 are configured to transmit and receive various types of information to and from the CPU 31a via an internal bus, for example.

The ECU 31 controls various processes performed by the on-vehicle device 3 by the CPU 31a that executes a computer program installed in the ROM 31c.

The computer program to be executed by the on-vehicle device 3 in the present embodiment may be provided by being incorporated in advance in the ROM 31c, or provided as a file in an installable or executable format on a computer readable storage medium such as a CD-ROM, a flexible disk (FD), a CD-R, and a digital versatile disc (DVD).

The computer program to be executed by the on-vehicle device 3 in the present embodiment may also be configured to be stored on a computer connected to a network such as the Internet, and to be provided by being downloaded via a network. The program executed by the on-vehicle device 3 in the present embodiment may also be configured to be provided or distributed via a network such as the Internet.

The storage device 31d stores map data used to identify the current location of the vehicle 6, the location of a home 5 associated with the vehicle 6, the driving history of the vehicle 6, and the like.

The GPS receiver 33 acquires GPS signals transmitted from GPS satellites by using a GPS antenna 34 and transmits the received GPS signals to the ECU 31. The GPS signals are used to identify the current position and travel direction of the vehicle 6.

The communication unit 35 is a unit that performs wireless communication with the server device 2. The on-vehicle device 3 transmits candidate parking locations and the like of the vehicle 6 to the server device 2. The on-vehicle device 3 also receives, from the server device 2, parking rates and the like for the candidate parking locations determined by dynamic pricing.

The center monitor 36 is installed in a center console of the vehicle 6, and displays a map of the surroundings of the vehicle 6, surrounding environment information of candidate parking locations, and the like.

The touch panel 37 is installed while being stacked on a screen of the center monitor 36. The touch panel 37 acquires information on operations performed by an operator on a graphical user interface (GUI) screen displayed on the center monitor 36. Note that the on-vehicle device 3 may also include physical switches in addition to the touch panel 37. The operation information acquired by the touch panel 37 is transmitted to the CPU 31a, and the CPU 31a performs processing according to the operation information. In the present embodiment, the CPU 31a performs processing according to operation information acquired by the touch panel 37; however, the CPU 31a may perform processing according to operation information input by voice, gesture, or the like.

The speaker 38 outputs the surrounding environment information of the candidate parking location and the like to occupants of the vehicle 6 by sound or voice.

Figure 3:
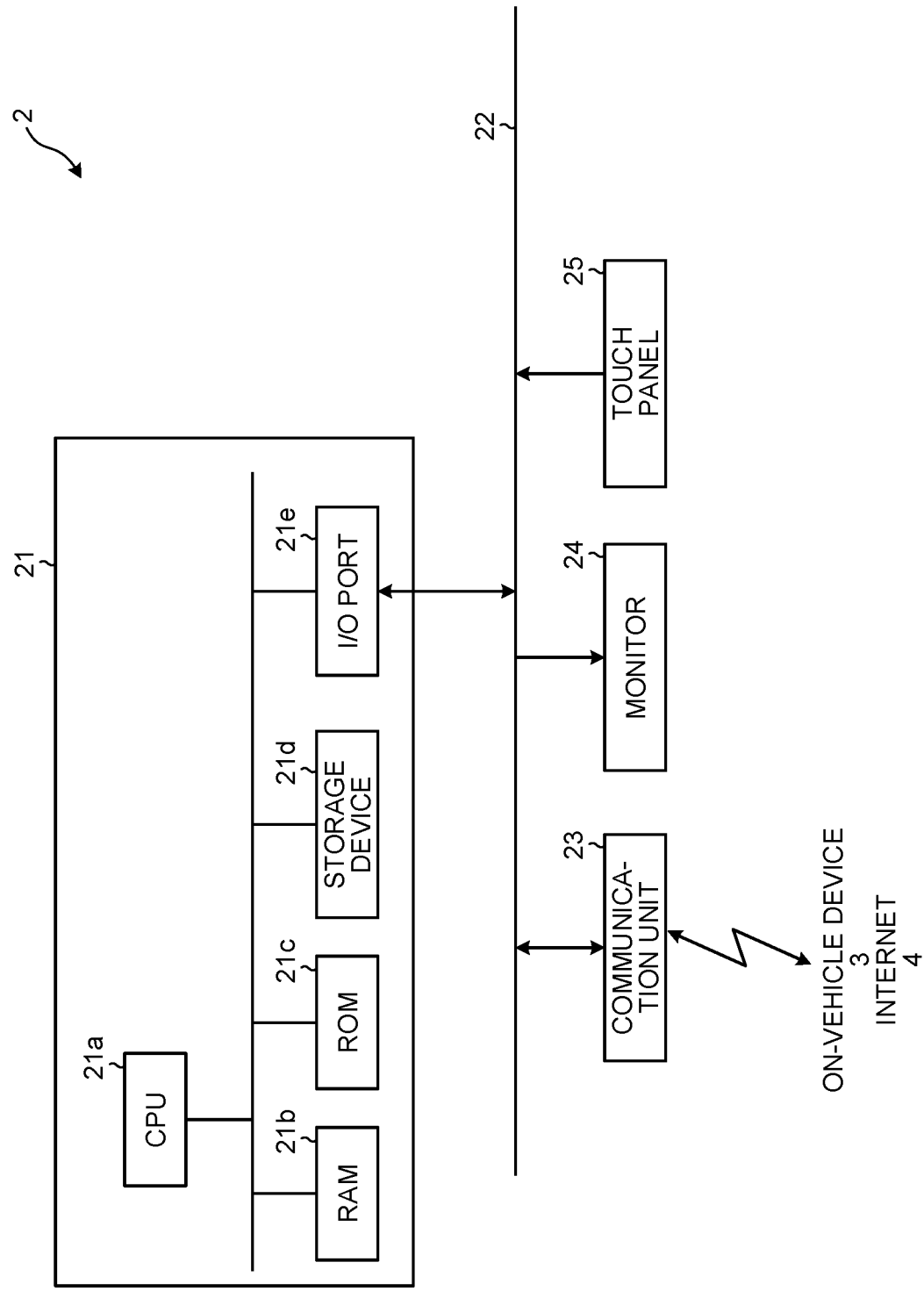
FIG. 3 is a hardware block diagram illustrating an example of a hardware configuration of a server device according to the first embodiment.

The hardware configuration of the server device 2 is described below with reference to FIG. 3. FIG. 3 is a hardware block diagram illustrating an example of the hardware configuration of the server device according to the first embodiment.

The server device 2 includes an ECU 21, a communication unit 23, a monitor 24, and a touch panel 25. These parts are connected to one another by a bus 22.

The ECU 21 is configured, for example, as a computer including a CPU 21a, a RAM 21b, and a ROM 21c. Note that the ECU 21 may have a built-in storage device 21d including an HDD or the like. The ECU 21 further includes an I/O port 21e that can transmit and receive signals to and from various peripheral devices.

The RAM 21b, the ROM 21c, the storage device 21d, and the I/O port 21e of the ECU 21 are configured to transmit and receive various types of information to and from the CPU 21a via an internal bus, for example.

The storage device 21d stores a destination, candidate parking locations, and the like of the vehicle 6, which are acquired from the on-vehicle device 3.

The communication unit 23 is a unit that performs wireless communication with the on-vehicle device 3 and the Internet 4. The server device 2 receives, from the on-vehicle device 3, the current location of the vehicle 6, the destination of the vehicle 6, the candidate parking locations of the vehicle 6, and the like. The server device 2 transmits, to the on-vehicle device 3, the surrounding environment information of the candidate parking locations of the vehicle 6, the parking rates determined by the dynamic pricing, traffic information from the current location to the destination of the vehicle 6, and the like. The server device 2 also receives traffic information and the like from the current location to the destination of the vehicle 6 from the Internet 4.

The monitor 24 displays an operating state and the like of the server device 2.

The touch panel 25 is installed while being stacked on a screen of the monitor 24. The touch panel 25 acquires information on operations performed by an operator on a GUI screen displayed on the monitor 24. The operation information acquired by the touch panel 25 is transmitted to the CPU 21a, and the CPU 21a performs processing according to the operation information.

Note that the server device 2 runs unattended day and night. Consequently, the monitor 24 and the touch panel 25 are used, for example, for maintenance of the server device 2.

Figure 4:
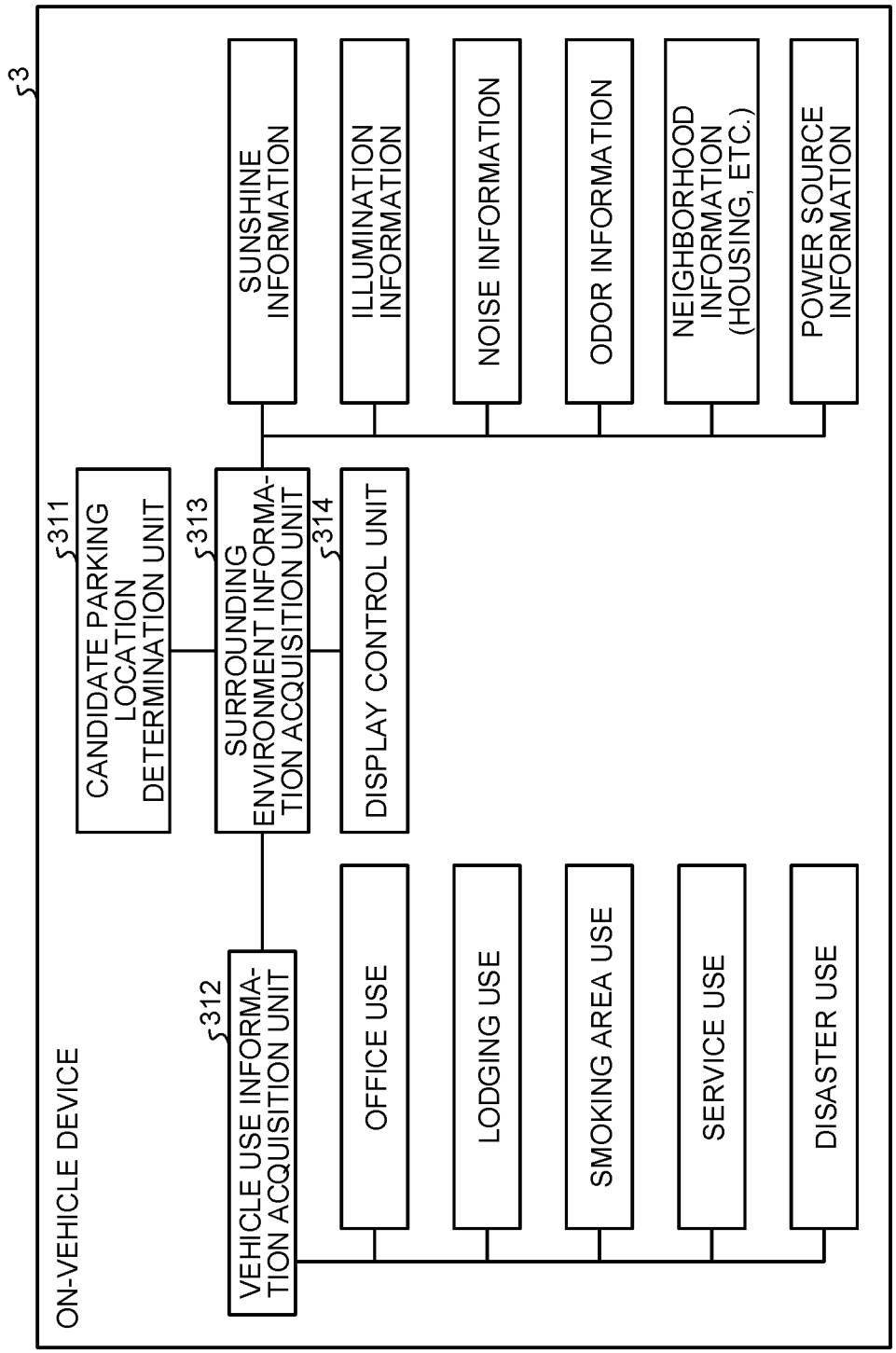
FIG. 4 is a functional block diagram illustrating an example of a functional configuration of the on-vehicle device according to the first embodiment.

The functional configuration of the on-vehicle device 3 is described below with reference to FIG. 4. FIG. 4 is a functional block diagram illustrating an example of the functional configuration of the on-vehicle device according to the first embodiment.

The ECU 31 (an example of a computer) of the on-vehicle device 3 (an example of an information processing device) loads a control program stored in the ECU 31 to the RAM 31b and causes the CPU 31a to execute the control program, thereby implementing, as functional units, a candidate parking location determination unit 311, a vehicle use information acquisition unit 312, a surrounding environment information acquisition unit 313, and a display control unit 314 as illustrated in FIG. 4. In the present embodiment, the on-vehicle device 3 is an example of an information processing device used in a parking lot management system. The parking lot management system is a system that stores parking lot information on preset parking lots.

The candidate parking location determination unit 311 is an example of a candidate parking location determination unit that determines candidate parking locations which are candidate parking locations of the vehicle 6. In the present embodiment, the candidate parking location determination unit 311 can also determine, as candidate parking locations, parking locations input as operation information by a user through the touch panel 37 or the like. In the present embodiment, the candidate parking location determination unit 311 can also automatically determine candidate parking locations of the vehicle 6 on the basis of the current location and destination of the vehicle 6. The candidate parking location determination unit 311 may also determine candidate parking locations on the basis of surrounding environment information acquired by the surrounding environment information acquisition unit 313 to be described below.

The vehicle use information acquisition unit 312 is an example of a vehicle use information acquisition unit that acquires vehicle use information indicating the purpose of use of the vehicle 6. The vehicle use information is information indicating the purpose of use of the vehicle 6. For example, the vehicle use information includes office use which is the use of the vehicle 6 as an office, lodging use which is the use of the vehicle 6 as a lodging place, smoking area use which is the use of the vehicle 6 as a smoking area, service use which is the use of the vehicle 6 as a mobile sales vehicle, disaster use which is use as means of transportation during disasters, and the like. In the present embodiment, the vehicle use information acquisition unit 312 acquires vehicle use information indicating the purpose of use and input as operation information by a user through the touch panel 37 or the like.

The surrounding environment information acquisition unit 313 is an example of a surrounding environment information acquisition unit that acquires surrounding environment information of the candidate parking locations determined by the candidate parking location determination unit 311. The surrounding environment information is information indicating the surrounding environment of the candidate parking location. For example, the surrounding environment information includes sunshine information (for example, sunny), illumination information (for example, low illumination), noise information (for example, noisy or quiet), odor information (for example, smelly), neighborhood information (for example, presence or absence of housing), and power source information (for example, presence or absence of power source) of the candidate parking location. In the present embodiment, the surrounding environment information acquisition unit 313 acquires the surrounding environment information of the candidate parking location from an external device such as the Internet 4 or the server device 3 on the basis of the candidate parking location; however, the surrounding environment information acquisition unit 313 may also acquire the surrounding environment information of the candidate parking location from a storage unit provided in the on-vehicle device 3. In the present embodiment, the surrounding environment information acquisition unit 313 may also acquire the surrounding environment information of the candidate parking location from a sensor installed in the vehicle.

In the present embodiment, the surrounding environment information acquisition unit 313 acquires surrounding environment information according to the vehicle use information acquired by the vehicle use information acquisition unit 312. This enables the selection of the best parking location for the purpose of use of the vehicle 6.

For example, when the purpose of use indicated by the vehicle use information is office use, the surrounding environment information acquisition unit 313 acquires, for example, sunshine, illumination, noise, nearby housing information, odor, and power source information as surrounding environment information according to demands for the parking location of the vehicle 6. For example, when the purpose of use indicated by the vehicle use information is lodging use, the surrounding environment information acquisition unit 313 acquires, for example, the presence or absence of neon lights or the like on the night street, surrounding noise at night, nearby housing information, odor, and power source information as surrounding environment information according to demands for the parking location of the vehicle 6. For example, when the purpose of use indicated by the vehicle use information is use for a disaster such as a tsunami, the surrounding environment information acquisition unit 313 acquires elevation information or the like of the parking location of the vehicle 6 as surrounding environment information according to demands for the parking location of the vehicle 6. Thus, the candidate parking location determination unit 311 can determine a candidate parking location that is less likely to be damaged by a tsunami, for example, determine, as a candidate parking location, a parking location existing at an altitude of 100 m above sea level, on the basis of the elevation information included in the surrounding environment information.

That is, the surrounding environment information acquisition unit 313 acquires surrounding environment information required for the purpose of use indicated by the acquired vehicle use information. Specifically, the external device such as the server device 3 may also store a database that associates the purpose of use of the vehicle 6 with the type of surrounding environment information required for the purpose of use, and the surrounding environment information acquisition unit 313 may also identify, in the database, the type of surrounding environment information associated with the purpose of use indicated by the acquired vehicle use information and acquire the identified type of surrounding environment information as surrounding environment information corresponding to the vehicle use information.

The surrounding environment information acquisition unit 313 may also acquire surrounding environment information of the parking location of the vehicle 6 from the parking lot management system. The parking lot management system is a system that stores parking lot information on preset parking lots (for example, a parking lot existing at the current location of the vehicle 6 and a parking lot existing at a destination input by a user of the vehicle 6). The parking lot information may be, for example, a parking location in the parking lot, a building in which the parking lot exists, the size of the parking location, the sunshine at the parking location, the weather in the parking lot, the presence or absence of a power source in the parking lot, the level of congestion in the parking lot, and vacancy information of the parking lot.

In this case, the candidate parking location determination unit 311 may also determine the candidate parking location of the vehicle 6 on the basis of the surrounding environment information acquired by the surrounding environment information acquisition unit 313. The candidate parking location determination unit 311 may also determine the candidate parking location on the basis of the surrounding environment information and the vehicle use information. In the present embodiment, the candidate parking location determination unit 311 selects parameters for the surrounding environment information on the basis of the acquired vehicle use information. The candidate parking location determination unit 311 changes coefficients of the selected parameters according to the acquired vehicle use information. Then, the candidate parking location determination unit 311 calculates a recommendation score, which is a score for the candidate parking location, on the basis of the selected parameters and the changed coefficients.

For example, the candidate parking location determination unit 311 calculates the recommendation score by using Equation 1 below. In Equation 1 below, X denotes a parameter of sunshine information, Y denotes a parameter of illumination information, Z denotes a parameter of odor information, and . . . denote parameters of the surrounding environment information and are preset values for each parking location. In Equation 1 below, α, β, γ . . . are respective coefficients of the parameters X, Y, and Z according to the vehicle use information.

$$\text{Recommendation score} = \alpha \times X + \beta \times Y + \ldots + \gamma \times Z \quad (1)$$

In the present embodiment, the parameters of the surrounding environment information for each parking location are preset; however, the present disclosure is not limited thereto and the parameters can also be automatically switched on the basis of the service preferences of a driver of the vehicle 6. The coefficients according to the vehicle use information may also be learned according to the parking location of the vehicle 6.

The display control unit 314 is an example of a display control unit that displays the surrounding environment information acquired by the surrounding environment information acquisition unit 313 on the touch panel 37 which is an example of a display unit. Specifically, the display control unit 314 may also generate display information representing a candidate parking location to which the surrounding environment information is added. Alternatively, the display control unit 314 may also generate display information representing the candidate parking location together with the surrounding environment information according to the purpose of use of the vehicle 6. Then, the display control unit 314 causes the display unit such as the touch panel 37 to output the generated display information. Thus, the parking location of the vehicle 6 can be selected while confirming the surrounding environment information corresponding to the candidate parking location of the vehicle 6, thereby increasing the convenience of a user of the vehicle 6.

In the present embodiment, the display control unit 314 can also display the recommendation score for each candidate parking location on the touch panel 37, together with the surrounding environment information acquired by the surrounding environment information acquisition unit 313. Specifically, the display control unit 314 generates display information including the recommendation score calculated by the candidate parking location determination unit 311, and causes the display unit such as the touch panel 37 to output the generated display information. Thus, when a plurality of candidate parking locations exist, whether which of the plurality of candidate parking locations is suitable for the purpose of use of a driver of the vehicle 6 can be easily confirmed, thereby further increasing the convenience of a user of the vehicle 6.

Figure 5:
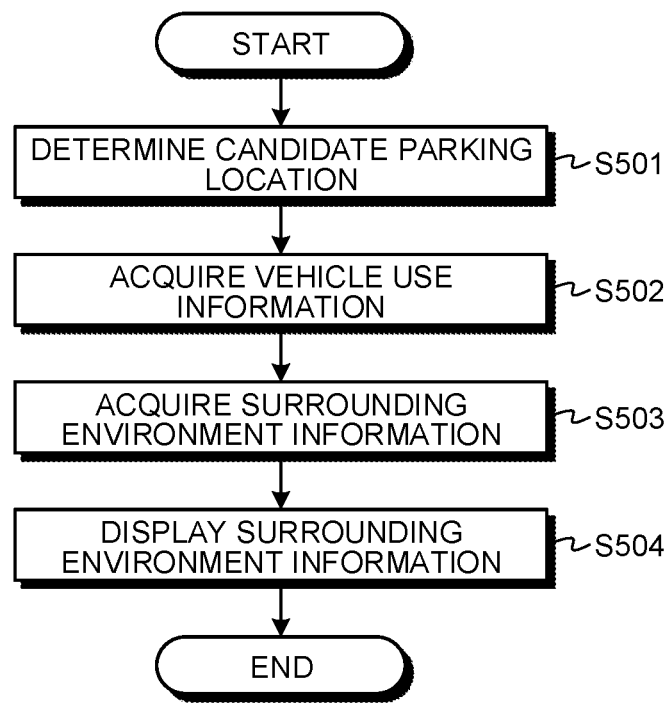
FIG. 5 is a flowchart illustrating an example of the flow of a process in which the on-vehicle device according to the first embodiment displays surrounding environment information of a candidate parking location.

An example of the flow of a process in which the on-vehicle device 3 according to the present embodiment displays surrounding environment information of a candidate parking location is described below with reference to FIG. 5. FIG. 5 is a flowchart illustrating an example of a process in which the on-vehicle device according to the first embodiment displays surrounding environment information of a candidate parking location.

First, the candidate parking location determination unit 311 determines a candidate parking location of the vehicle 6 on the basis of the current location and destination of the vehicle 6 (step S501). Subsequently, the vehicle use information acquisition unit 312 acquires vehicle use information on the basis of operation information input by a user through the touch panel 37 or the like (step S502).

Subsequently, the surrounding environment information acquisition unit 313 acquires surrounding environment information on the basis of the determined candidate parking location (step S503). Subsequently, the display control unit 314 displays the acquired surrounding environment information on the touch panel 37 (step S504).

In this way, in accordance with the on-vehicle device 3 according to the first embodiment, a parking location of the vehicle 6 can be selected while confirming surrounding environment information according to the candidate parking location of the vehicle 6, thereby increasing the convenience of a user of the vehicle 6.

Second Embodiment

The present embodiment is an example of displaying, on a display unit, surrounding environment information including parking rates for candidate parking locations based on vehicle use information. In the following description, description of the same configuration as in the first embodiment is omitted.

Figure 6:
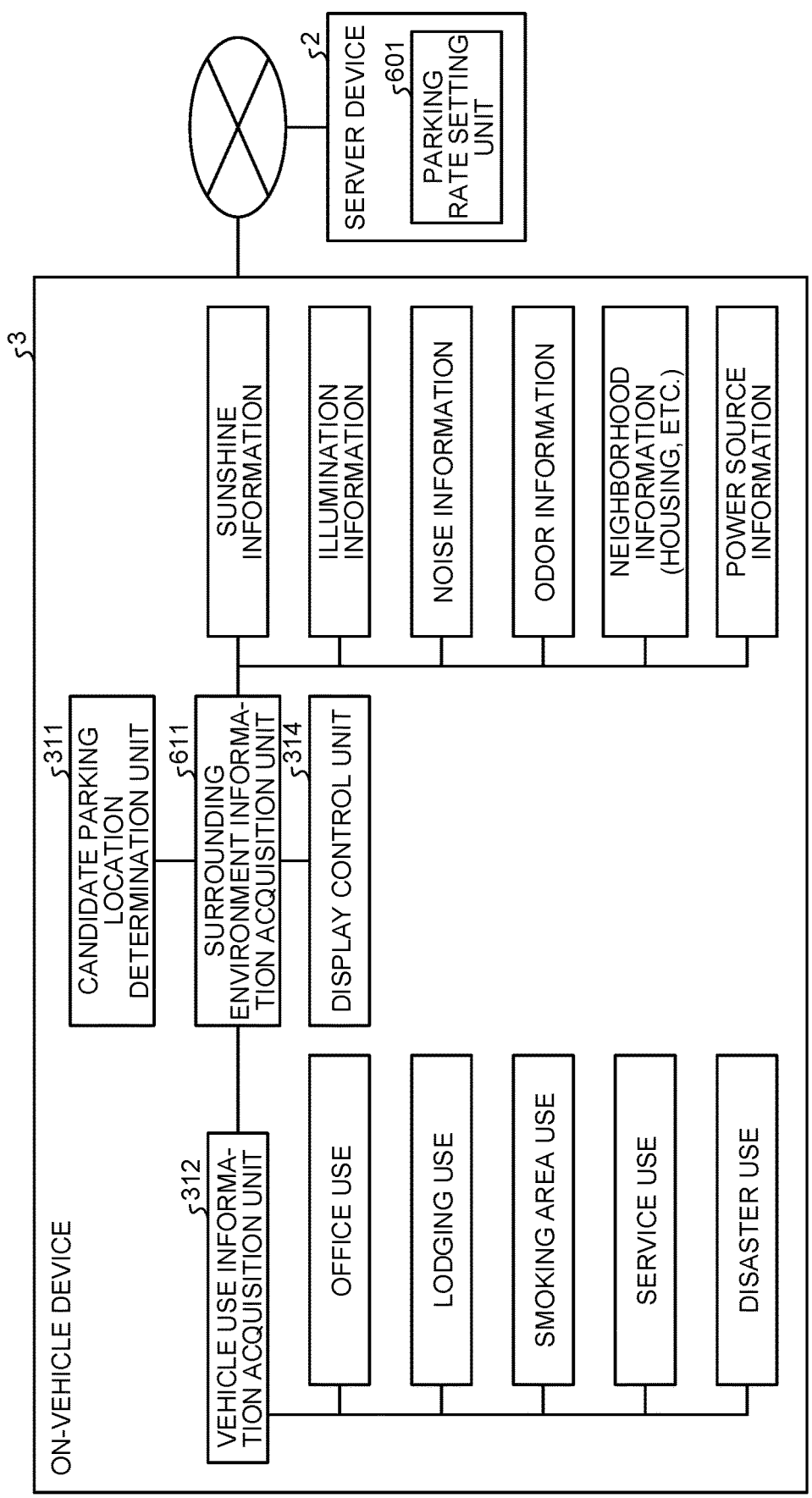
FIG. 6 is a functional block diagram illustrating an example of a functional configuration of an on-vehicle system and a server device according to a second embodiment.

First, an example of the functional configuration of the on-vehicle device 3 and the server device 2 according to the present embodiment is described with reference to FIG. 6. FIG. 6 is a functional block diagram illustrating an example of the functional configuration of the on-vehicle device and the server device according to the second embodiment.

The ECU 21 of the server device 2 loads the control program stored in the ECU 21 to the RAM 21*b* and causes the CPU 21*a* to execute the control program, thereby implementing a parking rate setting unit 601 as a functional unit as illustrated in FIG. 6. In the present embodiment, the parking rate setting unit 601 is provided in the server device 2; however, the parking rate setting unit 601 may be provided in an external device such as a cloud as long as the external device is a device with which the on-vehicle device 3 can communicate.

The parking rate setting unit 601 sets parking rates for parking locations through dynamic pricing. In the present embodiment, the parking rate setting unit 601 sets parking rates for parking locations on the basis of demands for a parking lot predicted from stop time information of the vehicle 6, entry time information of the vehicle 6, date/time/day information, event information, weather information, or the like. Then, the parking rate setting unit 601 transmits, to the on-vehicle device 3, a parking rate for the candidate parking location determined by the on-vehicle device 3 among the parking rates set by dynamic pricing.

For example, the parking rate setting unit 601 sets parking rates for parking locations by predicting changes in demands for parking lots through software as a service (SaaS) for airport parking lots. For example, the parking rate setting unit 601 sets parking rates for parking locations according to the presence of an event near a parking lot and demands for parking lots predicted from the usual usage situation.

The ECU 31 of the on-vehicle device 3 loads the control program stored in the ECU 31 to the RAM 31*b* and causes the CPU 31*a* to execute the control program, thereby implementing, as functional units, the candidate parking location determination unit 311, the vehicle use information acquisition unit 312, a surrounding environment information acquisition unit 611, and the display control unit 314, as illustrated in FIG. 6.

The surrounding environment information acquisition unit 611 acquires surrounding environment information including parking rates for candidate parking locations set on the basis of vehicle use information. Thus, a parking location of the vehicle 6 can be selected after confirming parking rates for candidate parking locations of the vehicle 6, thereby further increasing the convenience of a user of the vehicle 6. Furthermore, profits when the vehicle 6 is used as an office or the like can be maximized.

In the present embodiment, the surrounding environment information acquisition unit 611 can also acquire surrounding environment information including parking rates for candidate parking locations set on the basis of vehicle use information and sales information of the vehicle 6. For example, when the purpose of use of the vehicle 6 is mobile sales or office use, the surrounding environment information acquisition unit 611 acquires surrounding environment information including parking rates for candidate parking locations set on the basis of sales information when the vehicle 6 is used.

Alternatively, for example, the surrounding environment information acquisition unit 611 may also acquire surrounding environment information including parking rates for candidate parking locations set on the basis of sales information when the vehicle 6 was used in the past. For example, when actual sales of the vehicle 6 do not reach predicted sales, the surrounding environment information acquisition unit 611 may also change parking rates for candidate parking locations and acquire surrounding environment information including the changed parking rates.

Furthermore, the surrounding environment information acquisition unit 611 acquires the parking rates set by the parking rate setting unit 601 of the server device 2 (parking rates for parking locations set by dynamic pricing), and sets parking rates for candidate parking locations on the basis of the parking rates and parking rates for candidate parking locations set on the basis of vehicle use information. The surrounding environment information acquisition unit 611 may also acquire surrounding environment information including the set parking rates.

In this way, in accordance with the on-vehicle device 3 according to the second embodiment, a parking location of the vehicle 6 can be selected after confirming parking rates for candidate parking locations of the vehicle 6, thereby further increasing the convenience of a user of the vehicle 6.

Furthermore, profits when the vehicle 6 is used as an office or the like can be maximized. In the present embodiment, when the vehicle 6 uses a parking location on a regular basis, the surrounding environment information acquisition unit 611 can also acquire surrounding environment information including parking rates for candidate parking locations set on the basis of sales information for a certain period such as the previous day, one week, or one month.

Third Embodiment

The present embodiment is an example in which an information processing device used in a parking lot management system generates display information representing candidate parking locations to which surrounding environment information is added and displays the display information on a display of an on-vehicle device. In the following description, description of the same configurations as in the embodiments described above is omitted.

Figure 7:
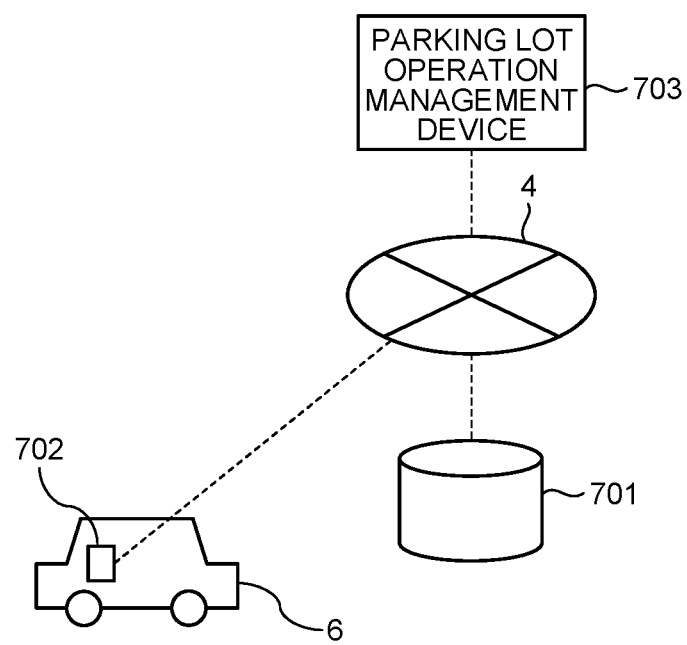
FIG. 7 is a diagram illustrating an example of a schematic configuration of a parking navigation system according to a third embodiment.

FIG. 7 is a diagram illustrating an example of a schematic configuration of a parking navigation system according to the third embodiment. A parking navigation system 700 according to the present embodiment includes a server device 701, an on-vehicle device 702, and a parking lot operation management device 703 as illustrated in FIG. 7.

The parking lot operation management device 703 stores surrounding environment information of parking locations in a parking lot. The surrounding environment information includes static information and dynamic information. The static information includes a map of the parking lot, a building in which the parking lot exists, a distance from a parking location to a store, the presence or absence of a roof at the parking location, and the like. The dynamic information includes weather and temperature of the parking lot, the level of congestion in the parking lot, vacancy information of the parking lot, illumination information of the parking lot, sunshine information of the parking lot, power source information of the parking lot, and the like.

The on-vehicle device 702 is an example of a user's information terminal and displays display information representing candidate parking locations determined by the server device 701 on the touch panel 37 or the like. In the present embodiment, an example of the user's information terminal is described as the on-vehicle device 702; however, the present disclosure is not limited thereto and any information terminal can be used as long as the information terminal can communicate with the server device 701 and may be an information terminal such as a user's smartphone.

The server device 701 is an example of an information processing device used in a parking lot management system that manages parking lots, and judges candidate parking locations of the vehicle 6 on the basis of vehicle use information and surrounding environment information. The vehicle use information may include main purpose information and sub-purpose information. The main purpose information is the purpose of use of a parking location outside the vehicle 6, and may be, for example, food purchase, clothing purchase, furniture purchase, or a combination thereof. The sub-purpose information is the purpose of use of a parking location inside the vehicle 6, and may be, for example, work such as a web conference, eating and drinking, or nursery.

Figure 8:
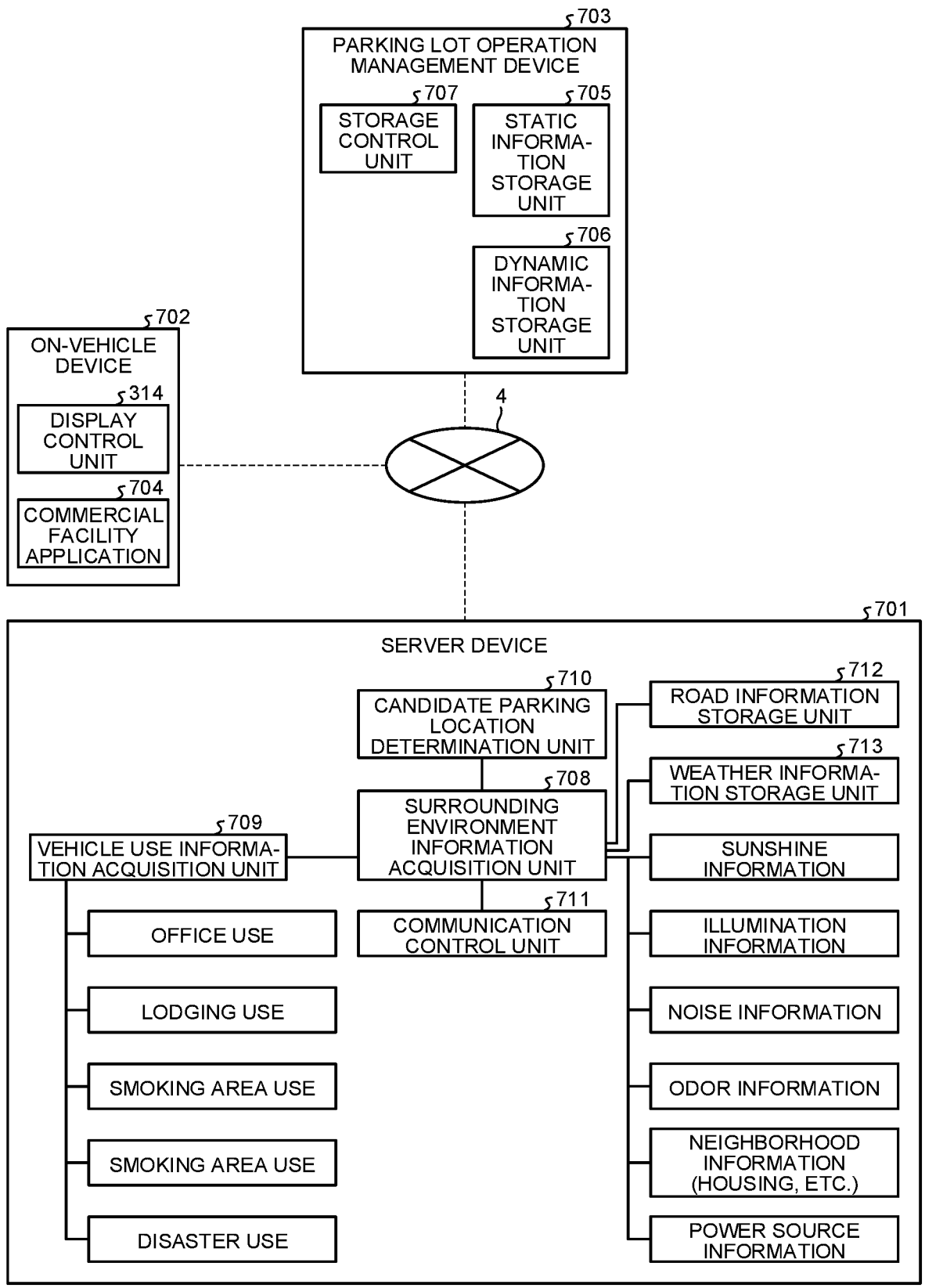
FIG. 8 is a diagram illustrating an example of a functional configuration of the parking navigation system according to the third embodiment.

FIG. 8 is a diagram illustrating an example of a functional configuration of the parking navigation system according to the third embodiment. As illustrated in FIG. 8, the on-vehicle device 702 according to the present embodiment includes the display control unit 314 and a commercial facility application provided by a commercial facility management device (hereinafter, referred to as "commercial facility application") 704. The commercial facility application 704 displays the candidate parking locations determined by the server device 701 on the display unit such as the touch panel 37. The commercial facility application further performs authentication of a user using the on-vehicle device 702, selection of vehicle use information, selection and reservation of parking lots or parking locations, and the like.

In the present embodiment, the parking lot operation management device 703 includes a static information storage unit 705, a dynamic information storage unit 706, and a storage control unit 707 as illustrated in FIG. 8. The static information storage unit 705 stores static information. The dynamic information storage unit 706 stores dynamic information. The storage control unit 707 reads the static information and the dynamic information from the static information storage unit 705 and the dynamic information storage unit 706 in response to a request for acquisition of surrounding environment information from the server device 701, and transmits the read static information and dynamic information to the server device 701.

As illustrated in FIG. 8, the server device 701 includes a surrounding environment information acquisition unit 708, a vehicle use information acquisition unit 709, a candidate parking location determination unit 710, a communication control unit 711, a road information storage unit 712, and a weather information storage unit 713, which are implemented by the ECU 21 (an example of a computer) that loads the control program stored in the ECU 21 to the RAM 21*b* and causes the CPU 21*a* to execute the control program.

The road information storage unit 712 stores road information such as traffic congestion information up to a candidate parking location, the road information being an example of surrounding environment information of the candidate parking location of the vehicle 6. The weather information storage unit 713 stores weather information such as the weather at the candidate parking location and the weather on a road to the candidate parking location, the weather information being an example of the surrounding environment information of the candidate parking location of the vehicle 6.

The vehicle use information acquisition unit 709 acquires vehicle use information set or input in the on-vehicle device 3 which is an example of a user's information terminal. The vehicle use information is information indicating the purpose of use of the vehicle 6. The vehicle use information includes in-vehicle use information (sub-purpose information) such as using the vehicle 6 itself as an office, and out-of-vehicle use information (main purpose information) such as using facilities outside the vehicle.

Specifically, the in-vehicle use information may be office use being the use of the vehicle 6 as an office, lodging use being the use of the vehicle 6 as a lodging place, smoking area use being the use of the vehicle 6 as a smoking area, service use being the use of the vehicle 6 as a mobile sales vehicle, disaster use being the use as means of transportation during a disaster such as a tsunami, and the like. In the case of a commercial facility with a parking lot, the out-of-vehicle use information includes shopping at stores in the commercial facility, participating in events, and the like.

For example, in the case of a commercial facility with a parking lot, a user can select office use, smoking area use, and service use as the in-vehicle use information, and select shopping at stores in the commercial facility, use of events inside the facility, and the like as the out-of-vehicle use information, depending on the purpose of use. When the out-of-vehicle use information is selected, a detailed use destination such as a floor map is displayed, a user can select the purpose of use suitable for the purpose. When a plurality of purposes of use exist, a user can select the best parking lot by selecting a final destination.

In the present embodiment, the vehicle use information acquisition unit 709 acquires vehicle use information indicating the purpose of use input by a user as operation information through the touch panel 37 of the on-vehicle device 3, or the like; however, the vehicle use information acquisition unit 709 may also acquire vehicle use information indicating the purpose of use input by voice or the like. The vehicle use information acquisition unit 709 may further automatically acquire vehicle use information according to the use history of the vehicle 6 so far and a schedule input to a smartphone or the like.

The surrounding environment information acquisition unit 708 acquires surrounding environment information of a candidate parking location determined by the candidate parking location determination unit 710. The surrounding environment information is information indicating a surrounding environment related to a parking location in a parking lot, and may include static information such as map information and dynamic information such as weather, temperature, and the degree of congestion. In the present embodiment, the surrounding environment information acquisition unit 708 acquires the road information and the weather information from the road information storage unit 712 and the weather information storage unit 713 as the surrounding environment information.

In the present embodiment, the surrounding environment information acquisition unit 708 acquires the static information and the dynamic information from the parking lot operation management device 703 as the surrounding environment information. For example, the static information includes map information such as a distance from a parking lot to an entrance to a building, and building information indicating whether the parking lot has a roof (for example, a multistory parking lot). The dynamic information includes weather information, temperature information, congestion information, sunshine information (for example, sunny), illumination information (for example, low illumination), noise information (for example, noisy or quiet), odor information (for example, smelly), neighborhood information (for example, presence or absence of housing), and power source information (for example, presence or absence of power source) of a candidate parking location.

The surrounding environment information is information that affects user's activities during the period in which a user parks the vehicle 6 at a parking location, and may include, for example, the time the user parks the vehicle 6 at the parking location, a parking time zone at the parking position, and the like.

The candidate parking location determination unit 710 determines candidate parking locations on the basis of the surrounding environment information and the vehicle use information. Specifically, the candidate parking location determination unit 710 identifies surrounding environment information corresponding to the purpose of use of the vehicle 6 indicated by the vehicle use information. For example, when the purpose of use indicated by the vehicle use information is office use, the candidate parking location determination unit 710 identifies surrounding environment information on office use such as power source information, illumination information, and odor information. The candidate parking location determination unit 710 extracts a candidate for a parking lot (hereinafter, referred to as a "candidate parking lot") that matches the identified surrounding environment information. For example, the candidate parking location determination unit 710 may extract a candidate parking lot existing at the current location or destination of the vehicle 6. Then, the candidate parking location determination unit 710 judges (determines) a candidate parking location at the extracted candidate parking lot. The candidate parking location is a candidate for a parking location existing in the extracted candidate parking lot.

The communication control unit 711 outputs display information representing the determined candidate parking location to be displayed on an information terminal such as the on-vehicle device 3. Alternatively, the communication control unit 711 may output display information representing the candidate parking lot and the candidate parking location to be displayed on the information terminal. Thus, a candidate parking location determined on the basis of surrounding environment information according to the purpose of use of the vehicle 6 can provided to a user, thereby increasing the convenience of a user of the vehicle 6.

Figure 9:
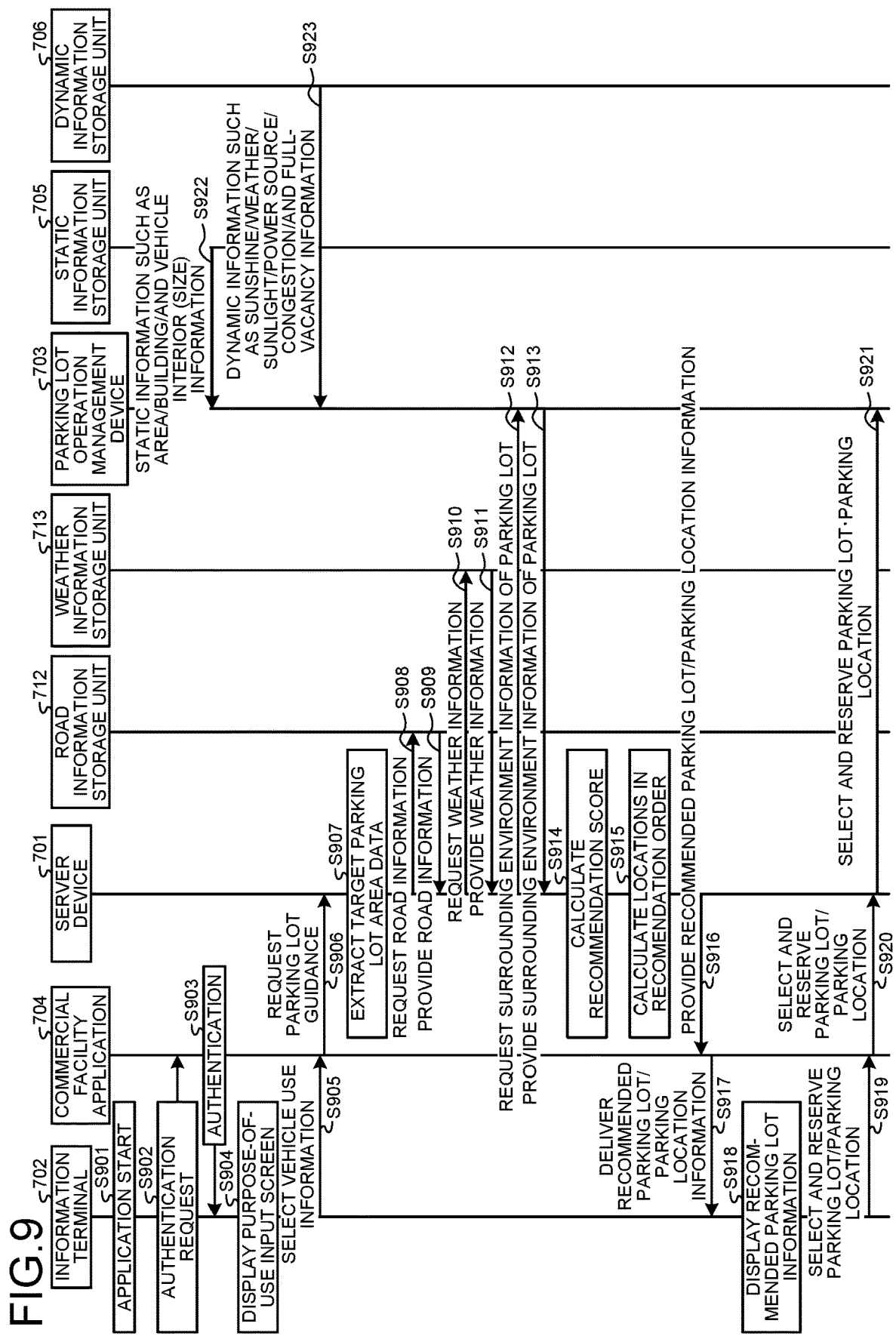
FIG. 9 is a sequence diagram illustrating an example of the flow of a process of providing candidate parking locations in the parking navigation system according to the third embodiment.

FIG. 9 is a sequence diagram illustrating an example of the flow of a process of providing candidate parking locations in the parking navigation system according to the third embodiment. First, when the commercial facility application 704 is started on an information terminal such as the on-vehicle device 702 (step S901), the display control unit 314 requests the commercial facility application 704 to authenticate a user (step S902).

The commercial facility application 704 authenticates the user (step S903). Subsequently, the display control unit 314 displays, on the touch panel 37, a purpose-of-use input screen on which the purpose of use of the vehicle 6 can be input (step S904). Subsequently, the display control unit 314 notifies the commercial facility application 704 of vehicle use information indicating the purpose of use input on the purpose-of-use input screen (step S905). The commercial facility application 704 transmits the vehicle use information to the server device 701, which is provided on a cloud or the like, and requests parking lot guidance (step S906).

Figure 10:
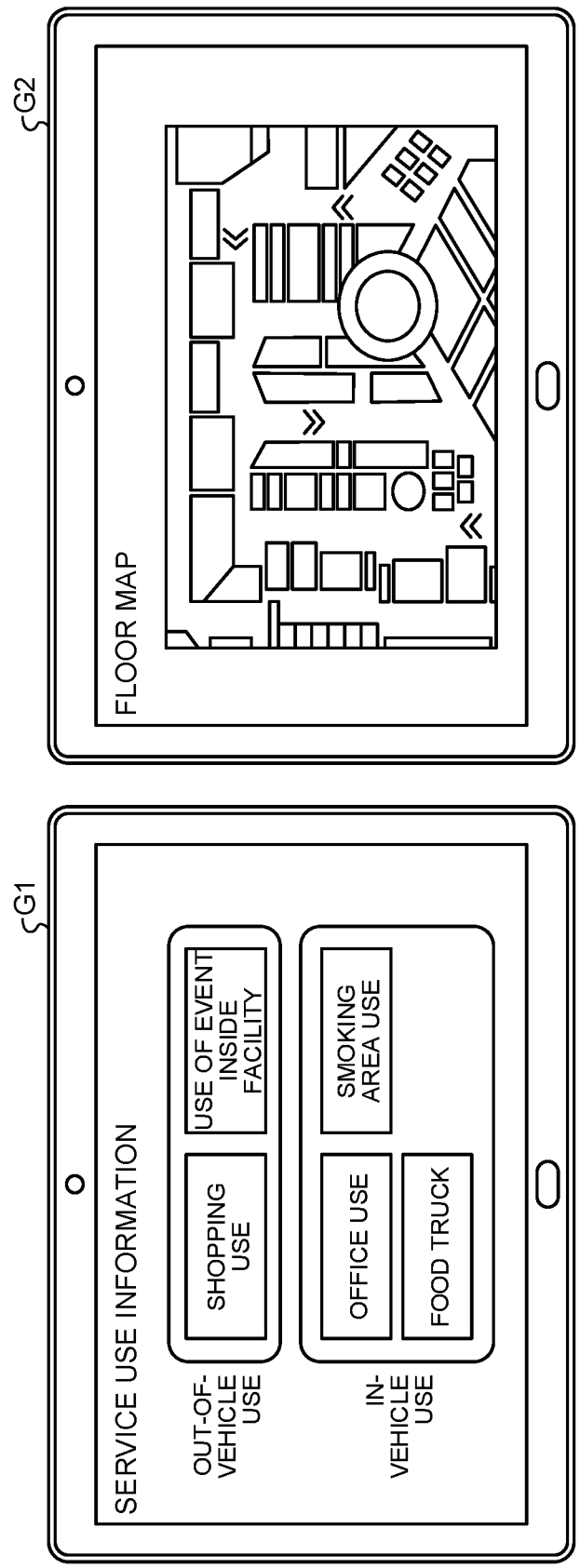
FIG. 10 is a diagram illustrating an example of a purpose-of-use input screen displayed on the parking navigation system according to the third embodiment.

FIG. 10 is a diagram illustrating an example of the purpose-of-use input screen displayed on the parking navigation system according to the third embodiment. In the present embodiment, as illustrated in FIG. 10, the display control unit 314 may display, on the touch panel 37, a purpose-of-use input screen G1 including buttons for selecting the purpose of use of the vehicle 6 or a purpose-of-use input screen G2 including a floor map showing a place for accomplishing the purpose of use of the vehicle 6.

Referring now back to FIG. 9, the vehicle use information acquisition unit 709 of the server device 701 acquires the vehicle use information received from the on-vehicle device 702. The surrounding environment information acquisition unit 708 extracts candidate parking lots as target parking lot area data (step S907). On the basis of the extracted candidate parking lots, the surrounding environment information acquisition unit 708 requests road information from the road information storage unit 712 and receives the road information from the road information storage unit 712 (step S908 and step S909). On the basis of the extracted candidate parking lots, the surrounding environment information acquisition unit 708 further requests weather information from the weather information storage unit 713 and receives the weather information from the weather information storage unit 713 (step S910 and step S911).

The surrounding environment information acquisition unit 708 further requests surrounding environment information of the extracted candidate parking lot from the parking lot operation management device 703, and receives the surrounding environment information including static information and dynamic information of the candidate parking lot (step S912 and step S913). Note that the storage control unit 707 of the parking lot operation management device 703 reads the static information and the dynamic information from the static information storage unit 705 and the dynamic information storage unit 706 in advance (step S922 and step S923). Subsequently, the storage control unit 707 provides the server device 701 with requested static information and dynamic information out of the static information and the dynamic information. Subsequently, the candidate parking location determination unit 710 calculates recommendation scores for the extracted candidate parking lots on the basis of the acquired vehicle use information and surrounding environment information (step S914). In the present embodiment, the candidate parking location determination unit 710 calculates the recommendation scores for the candidate parking lots in the same manner as the process of calculating the recommendation score for the candidate parking location in the first embodiment. On the basis of the calculated recommendation scores, the candidate parking location determination unit 710 further calculates the recommendation order of the extracted candidate parking lots (step S915). Subsequently, the communication control unit 711 delivers the candidate parking lots and the candidate parking locations to the on-vehicle device 702 via the commercial facility application 704 according to the calculated recommendation order (step S916 and step S917).

The display control unit 314 of the on-vehicle device 702 displays recommended parking lot information including the received candidate parking lots and candidate parking locations on a display unit such as the touch panel 37 (step S918).

FIG. 11 is a diagram illustrating an example of a display screen including recommended parking lot information in the parking navigation system according to the third embodiment. In the present embodiment, as illustrated in FIG. 11, the display control unit 314 may display, on the touch panel 37, a display screen G3 including the received candidate parking lots and candidate parking locations, or a display screen G4 including map information of the received candidate parking lots and candidate parking locations.

Referring now back to FIG. 9, subsequently, the display control unit 314 transmits a parking lot and a parking location selected by a user to the server device 701 as reservation information via the commercial facility application 704 (step S919 and step S920). Subsequently, the communication control unit 711 of the server device 701 transmits the received reservation information to the parking lot operation management device 703 (step S921).

Figure 12:
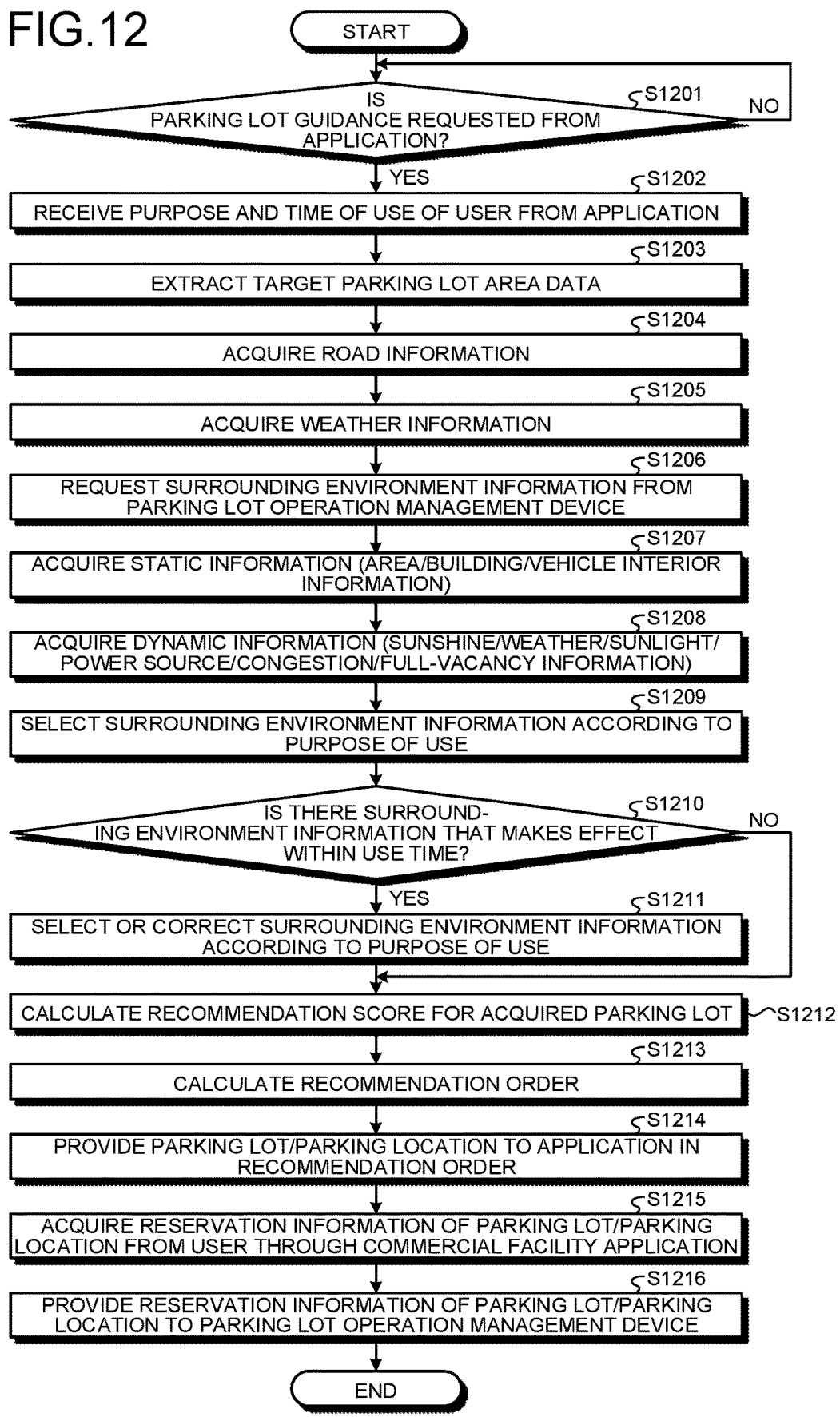
FIG. 12 is a flowchart illustrating an example of the flow of a process in which a server device of the parking navigation system according to the third embodiment transmits reservation information.

FIG. 12 is a flowchart illustrating an example of the flow of a process in which the server device of the parking navigation system according to the third embodiment transmits reservation information. In the present embodiment, when the commercial facility application 704 requests parking lot guidance (Yes at step S1201), the vehicle use information acquisition unit 709 acquires vehicle use information including the purpose and time of use of the vehicle 6 from the commercial facility application 704 (step S1202). The vehicle use information acquisition unit 709 may acquire, as the use time, a predetermined time (for example, two hours) from the time when the request for parking lot guidance is received. Subsequently, the candidate parking location determination unit 710 extracts candidate parking lots as target parking lot area data (step S1203).

Subsequently, the surrounding environment information acquisition unit 708 acquires road information from the road information storage unit 712 on the basis of the extracted parking lot candidates (step S1204). The surrounding environment information acquisition unit 708 further acquires weather information from the weather information storage unit 713 on the basis of the extracted candidate parking lots (step S1205).

The surrounding environment information acquisition unit 708 further requests surrounding environment information of the extracted candidate parking lots from the parking lot operation management device 703, and receives surrounding environment information including static information and dynamic information of a parking lot (step S1206 to step S1208). The candidate parking location determination unit 710 identifies surrounding environment information according to the purpose of use indicated by the vehicle use information (step S1209). The candidate parking location determination unit 710 further judges whether surrounding environment information that makes an effect within the use time exists in the identified surrounding environment information (step S1210). When the surrounding environment information that makes an effect within the use time exists (Yes at step S1210), the candidate parking location determination unit 710 corrects the surrounding environment information (step S1211). For example, when rain is forecast during the use time, the candidate parking location determination unit 710 corrects the type of parking lot included in the static information to information of a covered parking lot. For example, when no rain is forecast during the use time, the candidate parking location determination unit 710 corrects the type of parking lot included in the static information to information of an uncovered parking lot.

Subsequently, the candidate parking location determination unit 710 calculates recommendation scores for the candidate parking lots on the basis of the acquired surrounding environment information (step S1212), and calculates a recommendation order of the candidate parking lots and the candidate parking locations (step S1213). In the present embodiment, the candidate parking location determination unit 710 calculates the recommendation scores for the candidate parking lots in the same manner as the method of calculating the recommendation score for the candidate parking location in the first embodiment. Subsequently, the candidate parking location determination unit 710 calculates the recommendation order of the candidate parking lots and the candidate parking locations according to the recommendation scores. The communication control unit 711 provides the candidate parking lots and the candidate parking locations to the commercial facility application 704 according to the calculated recommendation order (step S1214) Subsequently, the communication control unit 711 acquires reservation information from the commercial facility application 704 (step S1215), and transmits the acquired reservation information to the parking lot operation management device 703 (step S1216).

In this way, in accordance with the parking navigation system 700 according to the third embodiment, a user of the vehicle 6 can be provided with candidate parking locations determined on the basis of surrounding environment information according to the purpose of use of the vehicle 6, thereby increasing the convenience of the user of the vehicle 6.

First Variation

The present variation is an example in which a server application provided by a server device provides candidate parking locations to an information terminal such as an on-vehicle device. In the following description, description of the same configuration as in the third embodiment is omitted.

In the present variation, instead of a commercial application, a server application provided by the server device 701 (hereinafter, referred to as a server application) displays candidate parking locations determined by the server device 701 on a display unit such as the touch panel 37. The server application further performs authentication of a user who uses the on-vehicle device 702, selection of vehicle use information, selection and reservation of parking lots or parking locations, and the like.

FIG. 13 is a sequence diagram illustrating an example of the flow of a process in which a parking navigation system according to the first variation provides candidate parking locations. In the present variation, the server application authenticates a user (step S1301) as illustrated in FIG. 13. As illustrated in FIG. 13, the server application further acquires vehicle use information from an information terminal such as the on-vehicle device 702, and transmits the vehicle use information to the server device 701 (step S1302).

As illustrated in FIG. 13, the server application further transmits the candidate parking lots and candidate parking locations to the on-vehicle device 702 according to a recommendation order calculated by the server device 701 (step S1303). As illustrated in FIG. 13, the server application further transmits reservation information selected by the on-vehicle device 702 to the server device 701 (step S1304).

Computer programs to be executed by the server devices 2 and 701 and the on-vehicle devices 3 and 702 in the present embodiment are provided by being incorporated in advance in a ROM or the like. The computer programs to be executed by the server devices 2 and 701 and the on-vehicle devices 3 and 702 in the present embodiment may be configured to be provided in an installable or executable format as a file on a computer readable storage medium such as a CD-ROM, a flexible disk (FD), a CD-R, and a digital versatile disc (DVD).

The computer programs to be executed by the server devices 2 and 701 and the on-vehicle devices 3 and 702 in the present embodiment may also be configured to be provided by being stored on a computer connected to a network such as the Internet and downloaded via the network. The computer programs to be executed by the server devices 2 and 701 and the on-vehicle devices 3 and 702 in the present embodiment may also be configured to be provided or distributed via a network such as the Internet.

In the present embodiment, the candidate parking location determination units 311 and 710 are described by way of example to determine a general parking lot (parking location) as a candidate parking location of the vehicle 6; however, a parking lot of a private home, a private property, or the like can also be determined as a candidate parking location.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A control method of an information processing device used for a parking lot management system, the control method causing a computer of the information processing device to perform:
    acquiring surrounding environment information of a parking location from the parking lot management system;
    acquiring vehicle use information indicating a purpose of use of a vehicle in the information processing device;
    determining a candidate parking location of a vehicle, based on the surrounding environment information;
    generating display information representing the candidate parking location to which the surrounding environment information is added; and
    causing a display of the information processing device to output the display information,
    wherein the surrounding environment information includes a parking rate for the candidate parking location set based on the vehicle use information and sales information of the vehicle.

2. A non-transitory computer-readable medium on which programmed instructions are stored, wherein the programmed instructions, when executed by a computer of the information processing device, cause the computer to perform the control method according to claim 1.

3. A control method of an information processing device used for a parking lot management system, the control method causing a computer of the information processing device to perform:
    acquiring surrounding environment information of a parking location from the parking lot management system;
    acquiring vehicle use information indicating a purpose of use of a vehicle in the information processing device;
    determining a candidate parking location of the vehicle, based on the surrounding environment information and the vehicle use information;
    generating display information representing the candidate parking location together with the surrounding environment information according to the purpose of use of the vehicle; and
    causing a display of the information processing device to output the display information,
    wherein the surrounding environment information includes a parking rate for the candidate parking location set based on the vehicle use information, and
    the surrounding environment information includes a parking rate for the candidate parking location, which is set based on a parking rate for the candidate parking location set by dynamic pricing and the parking rate for the candidate parking location set based on the vehicle use information.

4. The control method according to claim 3, wherein the determining of the candidate parking location comprises:
    selecting a parameter for the surrounding environment information, based on the vehicle use information;
    changing a coefficient of the parameter according to the vehicle use information; and
    calculating a recommendation score for the candidate parking location, based on the selected parameter and the changed coefficient, and
    the display information includes the recommendation score.

5. A non-transitory computer-readable medium on which programmed instructions are stored, wherein the programmed instructions, when executed by a computer of the information processing device, cause the computer to perform the control method according to claim 3.

6. An information processing device used for a parking lot management system, wherein a computer of the information processing device performs the control method according to claim 3.

7. An information providing method in a parking lot management system that manages a parking lot, the information providing method comprising:
    acquiring vehicle use information indicating a purpose of use of a vehicle by a user at the parking lot set by an information terminal of the user;
    acquiring surrounding environment information indicating a surrounding environment related to a parking location in the parking lot, the surrounding environment information being information that affects an activity of the user during a period in which the user parks the vehicle at the parking lot;
    judging a candidate parking location of the vehicle at the parking lot that matches the surrounding environment information corresponding to the purpose of use, based on the surrounding environment information and the vehicle use information indicating the purpose of use of the vehicle; and
    outputting display information indicating the judged candidate parking location to cause the information terminal to display it,
    wherein the surrounding environment information includes at least one of noise information of the parking location, odor information of the parking location, or information on a presence or absence of a power source at the parking location.

* * * * *